L. COLLER.
Broadcast Sowing-Machine.

No. 211,495.　　　　　　Patented Jan. 21, 1879.

Witnesses.　　　　　　Inventor.

UNITED STATES PATENT OFFICE.

LEWIS COLLER, OF FLINT, MICHIGAN.

IMPROVEMENT IN BROADCAST-SOWING MACHINES.

Specification forming part of Letters Patent No. 211,495, dated January 21, 1879; application filed August 23, 1878.

*To all whom it may concern:*

Be it known that I, LEWIS COLLER, of Flint, in the county of Genesee and State of Michigan, have invented a new and valuable Improvement in Machines for Sowing Broadcast; and I do hereby declare that the following is a full, clear, and exact description of the construction and operation of the same, reference being had to the annexed drawings, making part of this specification, and to the letters and figures of reference marked thereon.

This invention relates to agitators, pulverizers, or feeders for machines for sowing broadcast seeds and fertilizers; and the invention consists in a stirring-disk cast with oblique extensions or arms and an angular aperture, through which a square shaft passes, all as will be hereinafter fully described.

Figure 1:
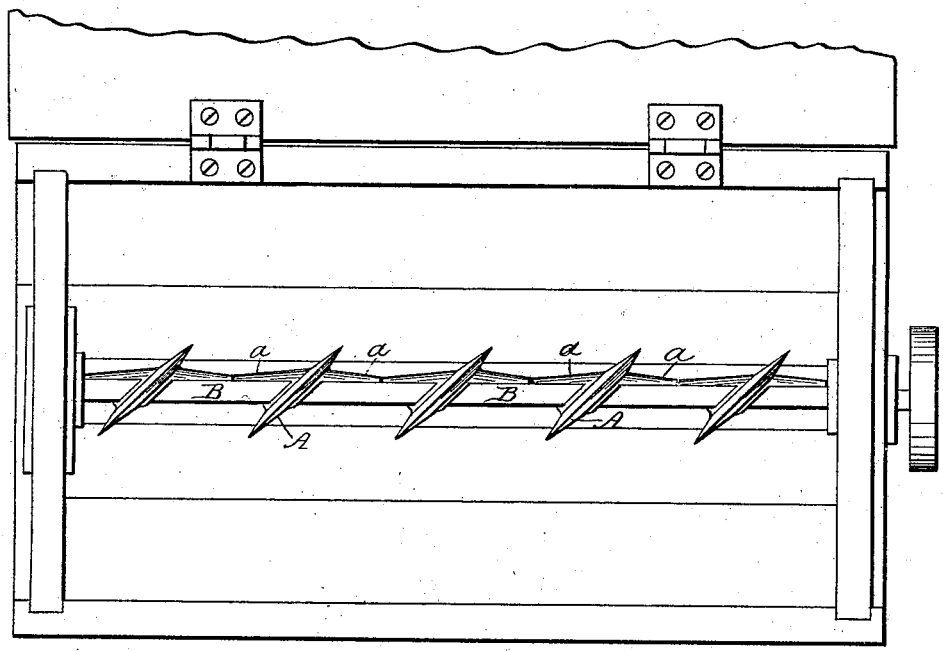
Figure 1:
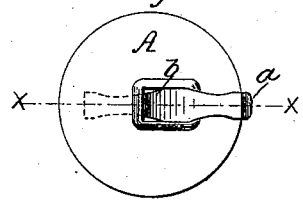
Figure 1:
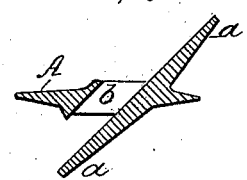

Figure 1 is a top view of the hopper, with the disks arranged for operation. Fig. 2 is an end view of one of the disks, and Fig. 3 is a sectional view on the lines $x\ x$ of Fig. 2.

In the drawing, A represents a stirring or agitating disk, provided with oblique extensions or arms $a\ a$ and an angular aperture, $b$, through which the square shaft B passes. The disk, when arranged upon the shaft, stands obliquely thereto, so that the extension or arms are in the same horizontal plane, whereby the arm of one disk comes in contact or abuts against the arm of the succeeding disk, as shown in Fig. 1. The arms of the disk not only act as agitators and pulverizers, but, being in the same horizontal plane, (when a series of disks are arranged upon the shaft,) they support each other from lateral displacement, thus dispensing with the use of wedges or screws for securing the disks upon the shaft. The disks and arms or extensions are cast or made in one piece.

What I claim as my invention, and desire to secure by Letters Patent, is—

In a machine for sowing seeds or fertilizers broadcast, the stirring or agitating disk A, provided with the oblique extensions or arms $a\ a$ and angular aperture $b$, substantially as herein described.

LEWIS COLLER.

Witnesses:
S. R. ATHERTON,
C. M. GROW.